S. EISENSTEIN.
APPARATUS FOR GENERATING UNDAMPED ELECTRIC OSCILLATIONS.
APPLICATION FILED SEPT. 5, 1907.
950,257.
Patented Feb. 22, 1910.
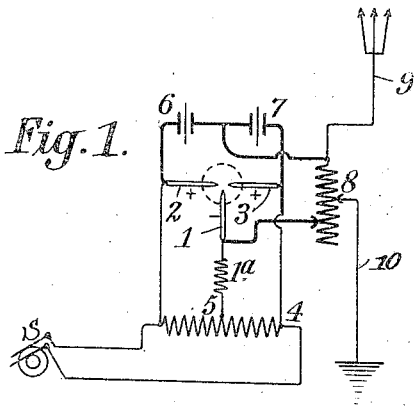
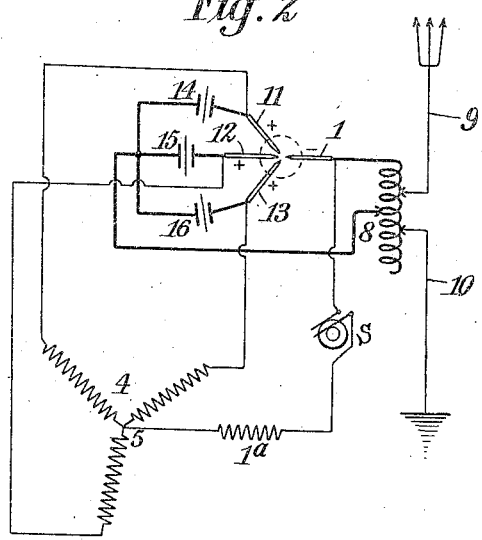
WITNESSES:
INVENTOR
Simon Eisenstein
BY
ATTORNEYS.

UNITED STATES PATENT OFFICE.

SIMON EISENSTEIN, OF KIEW, RUSSIA.

APPARATUS FOR GENERATING UNDAMPED ELECTRIC OSCILLATIONS.

950,257.     Specification of Letters Patent.     Patented Feb. 22, 1910.

Application filed September 5, 1907. Serial No. 391,477.

*To all whom it may concern:*

Be it known that I, SIMON EISENSTEIN, a subject of the Czar of Russia, residing in Kiew, in said Empire of Russia, have invented certain new and useful Improvements in Apparatus for Generating Undamped Electric Oscillations, of which the following is a specification.

Repeated tests made with undamped oscillations by using Duddell oscillatory circuits have shown that it is necessary when such oscillations are to be kept up for a considerable length of time to cool the positive electrode of the arc used for the same. Heretofore this electrode was made from metal and artificially cooled by water when currents of great strength are used.

The object of the invention is to use several positive electrodes, so that one or the other can be employed for the formation of the arc; one only being in action, while in the meantime the other can be cooled either naturally or artificially, so that the two electrodes taken together are subjected to a considerably diminished heating action than heretofore. As exciting current for the arc a single-phase or multiphase alternating current can be used.

In the accompanying drawing, Figure 1 represents a diagram showing the arrangement for a single-phase alternating current, and Fig. 2 is a diagram showing the arrangement in connection with a multiphase alternating current.

Similar reference characters indicate the same parts in both figures of the drawing.

Referring to the drawing, 1 represents the negative electrode of an electric light arc and 2 and 3 are positive electrodes for the arc to be formed, which electrodes are preferably made of metal of great heat conductivity, and which may when necessary be cooled by artificial means. The positive electrodes 2 and 3 are connected with the ends of a transformer 4, or choking coil, while the negative electrode 1 is connected through a choking coil 1ª with the center of the transformer or choking coil 4. The alternating current is delivered from a suitable source S.

It is well known that by using alternating currents of low frequency, of about 40–60 periods, an arc can be formed between two metallic electrodes with considerable difficulty, while with metal and carbon electrodes an arc is formed more easily, especially when the metal forms the positive electrode and the carbon the negative electrode, and is only extinguished in case the minimum strength of the current is reached. This well known observation is considered in the arrangement shown in Fig. 1 for the reason that the arc can be formed more easily between one of the electrodes, which is in a certain moment positive, and the negative electrode, than between two metallic electrodes, of which one is positive and the other negative, though the tension between the negative electrode and one of the positive electrodes is only half as great as between the two metallic electrodes. According to the polar direction of the alternating current, the arc is formed either between the negative electrode 1 and the electrode 2, or the former and the electrode 3, the arc being formed in every case on the metallic electrode, which therefore in every case is the positive one. This result is generally known and is used, for instance, in mercury vapor lamps for the changing of an alternating current into a continuous current, so that further description of this feature is not necessary.

By the aid of the three electrodes 1, 2 and 3 the well known Duddell oscillatory circuit is formed, for which purpose the condensers 6 and 7 are used. These have the same size, but are connected in such a manner that only one at a time is called into action, according as the arc is formed between the negative electrode and the positive electrode 2 or between the former and the positive electrode 3. There are therefore, so to say, two oscillatory circuits formed, which, however, possess the auto-transformer 8, from which, according to the well known manner, either directly or inductively, the air-conductor 9 and the earth 10 are controlled. Inasmuch as the electrodes 2 and 3, according to the polar direction of the alternating current, are alternately called into action, and therefore subjected only temporarily to heating, the heating cannot reach such a degree as when the same electrodes are heated constantly in the formation of the arc. It is therefore possible that in such an arrangement conditions are produced where the phenomenon of generating undamped oscillations can take place in the best and easiest manner. It is therefore possible to arrange, for instance, the electrodes in an atmosphere containing hydrogen gases, or in compressed gases, in vacuum under insulating liquids, and in heated and ventilated media, without departing from the present invention. In addition to the foregoing it may be stated that this improved process for generating undamped oscillations as compared with the known process, has the advantage that it is easier to generate a current of high tension, which heretofore, by the use of a continuous current for this purpose, could not be possible under other conditions. As stated, the improved process can also be used by using as the exciting current a three-phase alternating current. An example of such an arrangement is shown in Fig. 2. In this case 1 is a negative electrode and 11, 12 and 13 are three electrodes which alternately act as positive electrodes and which are also formed of metal. The electrodes 11, 12 and 13 are connected with the ends of a rotary transformer 4, while the negative electrode 1 is connected over the choking coil 1ᵃ with the center 5 of the transformer. According to the succession of the phases the arc is formed between the negative electrode and alternately one of the positive electrodes 11, 12 and 13. Each of these positive electrodes is connected over the condensers 14, 15 and 16 with an auto-transformer 8 and the latter is influenced in the well known manner by the air-conductor 9 and earth 10. The condensers in this case have also an equal capacity.

Practical tests have clearly shown that the process described gives satisfactory results only when a single or multiphase current of low tension is used. When an alternating current of high tension is to be employed, the formation of the arc is interrupted and undamped oscillations cannot be generated. This disadvantage can be avoided when a mercury vapor lamp for changing the current that feeds the negative carbon is switched in, as, for instance, in Fig. 2, in the current which feeds the negative electrode. This arrangement can, however, be made also in such a manner that the mercury vapor lamp for making the current continuous (or other similar device) is switched into the conductors connected with the positive electrodes. Such device can also be applied to the negative as well as to the different positive feed current conductors. This permits the use not only of a current of higher tension, but has also the advantage that for the formation of the arc metallic electrodes can be used.

Having thus described my invention, I claim as new and desire to secure by Letters Patent:

1. In an apparatus for generating undamped electrical oscillations, an oscillating exciter composed of a negative electrode, a plurality of positive electrodes, an oscillatory circuit for each positive electrode, and means for causing an arc to form alternately between the different positive electrodes and the negative electrode.

2. In an apparatus for generating undamped electrical oscillations, an oscillating exciter composed of a single negative electrode, a plurality of positive electrodes, a plurality of oscillatory circuits in a shunt corresponding to the number of positive electrodes, and means for causing to be formed light arcs alternately between the positive electrodes and the negative electrode.

3. In an apparatus for generating undamped electrical oscillations, the combination of a negative electrode, a plurality of positive electrodes, a condenser connected to each positive electrode, means for establishing oscillations between said condenser and said negative electrode, and means for supplying alternating current separately to said electrodes.

4. In an apparatus for generating undamped electrical oscillations, the combination of a negative electrode, a plurality of positive electrodes, a plurality of condensers placed one each in series with each of the positive electrodes, an induction-coil connected at one end to said negative electrode, means for connecting said condensers to said coil, and means for conducting alternating currents to each of said electrodes.

5. In an apparatus for generating undamped electrical oscillations, the combination of an auto-transformer, a carbon electrode connected to one end of the auto-transformer, a plurality of metallic electrodes, a condenser connected to each metallic electrode, the other side of each condenser being connected to the other end of said transformer, and means for supplying alternating electric current to said carbon electrode and alternately to said metallic electrodes.

6. In an apparatus for generating undamped electrical oscillations, the combination of an auto-transformer, a carbon electrode connected to one end of the auto-transformer, a plurality of metallic electrodes, a condenser connected to each metallic electrode, the other side of each condenser being connected to the other end of said transformer, and an alternating-current generator having a neutral wire connected to said carbon electrode and its branches connected respectively to said metallic electrodes.

In testimony, that I claim the foregoing as my invention, I have signed my name in presence of two subscribing witnesses.

SIMON EISENSTEIN.

Witnesses:
 WOLDEMAR HAUPT,
 HENRY HASPER.